Feb. 17, 1970    C. R. LYONS ET AL    3,495,387
CUTTING ASSEMBLY FOR HARVESTER
Filed Sept. 5, 1967    2 Sheets-Sheet 2
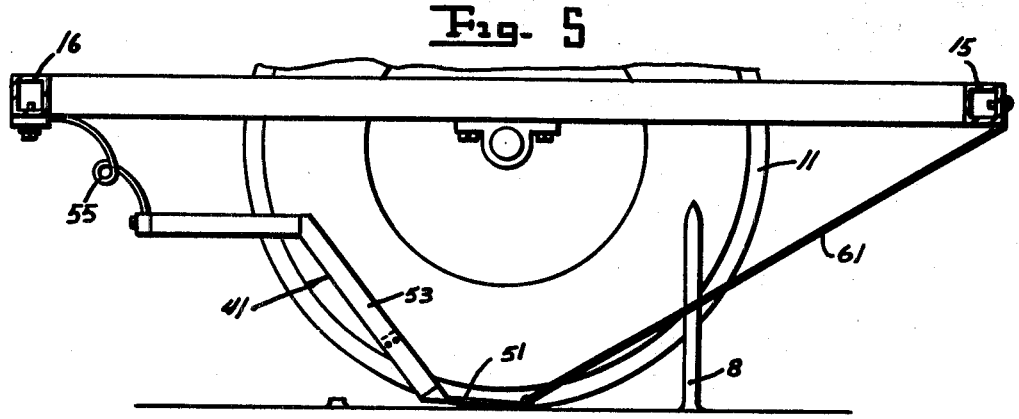
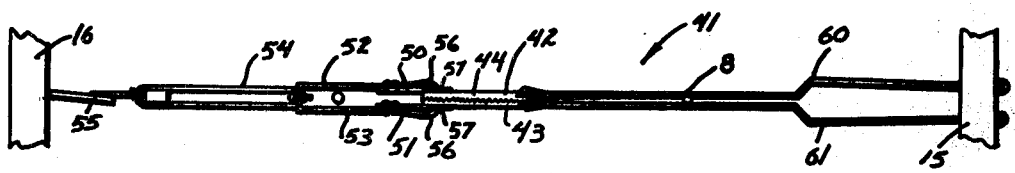
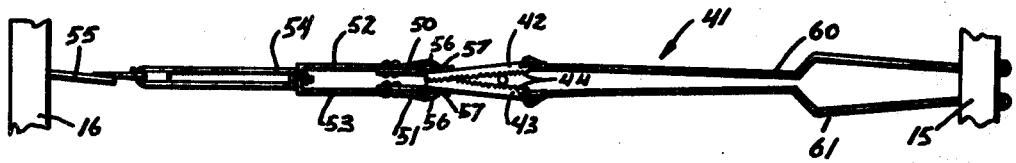
INVENTORS
CHARLES R. LYONS
ADAM D. DUNN
LESLIE WADEKEMPER
BY
Wells & St. John
ATTYS.

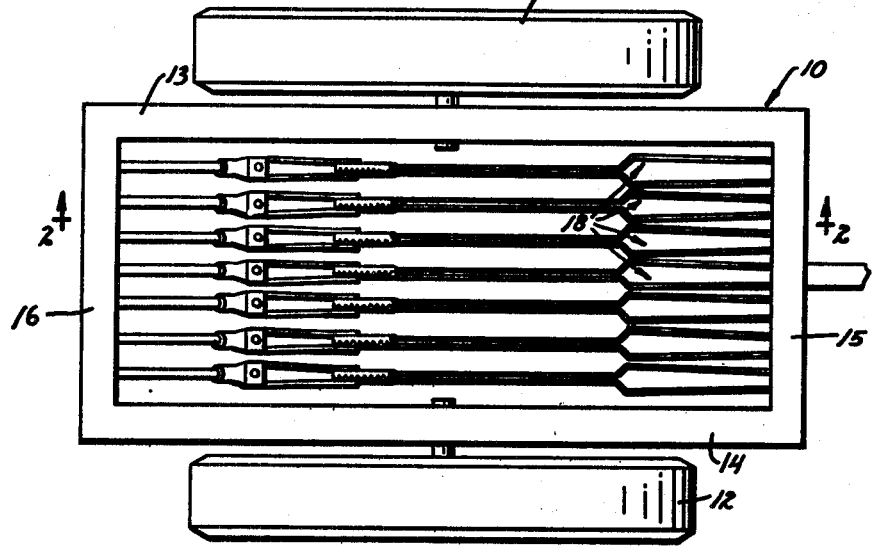
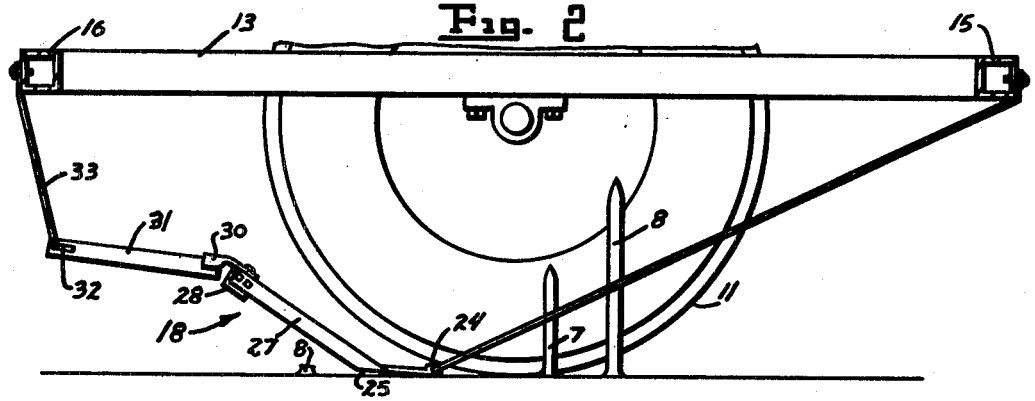

United States Patent Office 3,495,387
Patented Feb. 17, 1970

3,495,387
CUTTING ASSEMBLY FOR HARVESTER
Charles R. Lyons and Adam D. Dunn, both of Rte. 2, Box 119B, Zillah, Wash. 98953; and Leslie Wadekemper, 17 Loahtanum Road, Rte. 7, Yakima, Wash. 98903
Filed Sept. 5, 1967, Ser. No. 665,549
Int. Cl. A01d 45/00
U.S. Cl. 56—327    3 Claims

ABSTRACT OF THE DISCLOSURE

A plurality of cutting assemblies 18 are suspended from a harvester frame for severing mature asparagus shoots. Each assembly 18 has a pair of blades 20 and 21 which are resiliently connected by leaf springs 26 and 27 for biasing the blades into cutting engagement and for permitting debris and undesirable vegetation to pass between the blades without entangling the assembly. Guide wires 37 and 38 are attached to the front of the blades for opening the blades to present the cutting edges as a mature shoot moves along the wires.

Background of the invention

This invention relates to vegetation cutting devices and more particularly to cutting devices for severing shoots of asparagus and the like.

An asparagus harvester is disclosed in United States Patent No. 3,426,516, issued Feb. 11, 1969; for harvesting asparagus without damaging the individual spears. As part of the harvester guiding and cutting assemblies are provided the guide individual asparagus shoots to transverse cutting wires for severing the shoots as the harvester moves over the field. Although the arrangement generally operates satisfactorily, occasionally the transverse cutting wire becomes entangled in weeds and other debris.

One of the principal objects of this invention is to provide an improved cutting device that will not become entangled with weeds or debris.

An additional object of this invention is to provide a guide means for presenting the cutting edges of the blades to the mature asparagus shoots as the blades approach the shoot and for opening the blades only when the guide means sense a mature asparagus shoot.

A further object of this invention is to provide a novel resilient biasing means for biasing the blades together for severing the asparagus shoots.

An additional object of this invention is to provide guide and cutting assemblies that cut only the mature asparagus shoots without damaging the immature shoots.

These and other objects and advantages of this invention will become apparent upon the reading of the following description of the two embodiments.

Brief description of the drawings

Embodiments of this invention are shown in the accompanying drawings, in which:

FIG. 1 is a plan view of a portion of a mobile asparagus harvester showing a plurality of side-by-side guiding and cutting assemblies;

FIG. 2 is a cross sectional view taken along line 2—2 in FIG. 1 showing in side elevation one of the guiding and cutting assemblies.

FIG. 3 is a fragmentary enlarged plan view of the guiding and cutting assembly shown in FIG. 2 showing the cutting blades in an overlapped closed position;

FIG. 4 is a view similar to FIG. 3 except showing the cutting blades open to cut a mature asparagus shoot;

FIG. 5 is a side elevation view showing an alternate guiding and cutting assembly for cutting mature asparagus shoots;

FIG. 6 is a fragmentary plan view of the alternate guiding and cutting assembly showing the blades in a closed overlapping position; and FIG. 7 is a fragmentary plan view similar to FIG. 6 except showing the blades open for cutting a mature asparagus shoot.

Description of a preferred and alternate embodiment

Referring in detail to the drawings, there is shown in FIG. 1 a mobile harvester frame 10 that is supported by side ground engaging wheels 11 and 12. The frame includes side channels 13 and 14 and front and rear channels 15 and 16. The mobile harvester frame 10 has a plurality of guiding and cutting assemblies 18 suspended therefrom in longitudinal side by side orientation for selectively cutting the vegetation shoots 8 such as asparagus and the like.

Each guiding and cutting assembly 18 has two complementary blades 20 and 21 (FIGS. 3 and 4) that have longitudinal inside cutting edges 22. The inside edges 22 are shown with sharp teeth for performing the cutting action. As shown in FIG. 2 the blades are positioned at slight inclined forward orientation with the toe or front end 24 slightly below the heel or back end 25. The blades 20 and 21 are independently connected to resilient means that bias the blades together in cutting relationship. Specifically the resilient means include parallel leaf springs 26 and 27 (FIGS. 3 and 4) that are connected to the rear of the blades 20 and 21 respectively. The leaf springs 26 and 27 extend from the rear of the blades upwardly and rearwardly to a spacer block 28 that is elevated substantially above the blades 20 and 21. A bracket 30 is connected to the spacer block for rigid connection with a longitudinal arm 31. The arm 31 has a longitudinal groove 32 formed therein for receiving the lower bent end of a depending support wire 33. The upper end of the support wire 33 is attached to the rear channel frame 16. The longitudinal groove 32 which receives the bent end of the wire 33 permits the longitudinal movement of the arm a short distance. The support wire 33 permits a small degree of the lateral movement of the blades to enable the blades to be directed to the mature shoots.

Guiding and sizing wires 37 and 38 extend from the front channel 15 rearward and downward in a converging manner to the toes 24 of the blades 20 and 21 respectively. The wires 37 and 38 perform several functions. One of the functions is to present only the mature shoots 8 to the cutting blades while permitting the immature shoots 7 to pass to the side of the blades. This sizing function is performed by bringing the wires from a wide spacing at the channel to a converging narrowing gap at the front end of the blades so that the diameter of a mature shoot 8 will spread the wires apart as the shoot approaches the blades. Intermediate the ends of the wires, the wires converge sharply at 39 to increase the selectively of the assembly. The distance between the wires 37 and 38 immediately forward of the blades 20 and 21 is less than the diameter of the mature shoot so that when the shoot moves along the guide wires, it will displace the guide wires to cause the forward end of the blades to open in a V-shape to present the cutting edges 22 to the shoot. Immature shoots 7 are shorter than the mature shoots, so that the mature shoots will engage the wires and move along the wires to the blades, whereas the immature shoots will pass under the wires and to the side of the blades.

Since the blades are normally biased in an overlapped position the sharpened cutting edges 22 are not subjected to damage when they are in the closed position.

The guiding and cutting assemblies are flexibly mounted beneath the harvester frame so that if the blades run into an obstruction the blades will pass over the obstruction without becoming entangled. If debris is caught between the wires 37 and 38, the debris will force the blades open and pass through the blades and through the space between the springs 26 and 27. Thus it should be appreciated that the guiding and cutting assemblies 18 are capable of cutting mature shoots without becoming entangled with weeds or debris.

An alternate guiding and cutting assembly 41 is shown in FIGS. 5–7. The alternate guiding and cutting assembly has overlapping blades 42 and 43 with serrated longitudinal cutting edges 44 (FIGS. 6 and 7).

Each of the blades 42 and 43 is independently resiliently mounted by spring means for biasing the blades together into overlapping and cutting engagement. Specifically, the spring means includes two spaced parallel light leaf springs 50 and 51 that are individually attached to the rear of the blades 42 and 43 and extend rearward and upward therefrom. The trailing ends of the light leaf springs 50 and 51 are riveted to parallel spacer heavy leaf springs 52 and 53 that extend upwardly and rearwardly to a spacer block 54 that defines the normal spacing between the leaf springs. A support spring wire 55 connects the spacer block to the rear of frame channel 16 to permit some longitudinal, vertical and lateral movement of the blades. The lower portion of the heavy duty springs 52 and 53 extend downward along side the light weight springs respectively, terminating in a curved arc at 56 with the end edges 57 engaging the outer edges of the blades. The end edges 57 of the heavy duty springs act as normal pivot points for the blades.

Guiding and sizing wires 60 and 61 similar to wires 37 and 38 extend from the front channel 15 in a downwardly and rearwardly converging manner to the toes of the blades 42 and 43. When a mature shoot 8 is located between the wires 60 and 61 it will spread the wires apart against the lightweight springs 50 and 51 as the shoot approaches the blades 42 and 43 to present the inside longitudinal cutting edges 44 in the form of a V with the blades pivoting about the end edges of the heavy duty springs as shown in FIG. 7 to cut the shoot as the harvester moves over the ground. The lightweight springs 50 and 51 permit the shoot to easily enter between the front of the blades without becoming bruised or broken. Then as the blades move forward the heavy springs 52 and 53 exert sufficient biasing force to completely sever the shoot. If undesirable vegetation or debris is presented to the blades, the springs will merely permit the blades to open up along the entire longitudinal distance of the blades to permit the vegetation to pass through the blades and the space between the leaf springs.

If dead, dry or unanchored debris is caught between the blades while a shoot is being cut, the debris will hold the blades partially open until the next shoot is selected and cut. The next shoot forces the debris to move out the back of the blades.

It should be understood that the above described embodiments are simply illustrative of the principles of this invention and that numerous other embodiments may be devised by those skilled in the art and fall within the scope of this invention. Therefore, only the following claims are intended to define this invention.

What is claimed is:

1. In a harvester for cutting shoots of mature asparagus or the like, a plurality of side-by-side guiding and cutting assemblies longitudinally suspended between front and rear frame members for cutting the shoots as the harvester moves forward, each of said guiding and cutting assemblies comprising:
    (a) complementary cutting blades having longitudinal cutting edges;
    (b) spring means operably supported from the rear frame members in a downward orientation for biasing the blades into cutting engagement; and
    (c) two spaced wires that are connected to the front frame members and extend downwardly and rearward in a converging orientation to attach to the front end of the blades to guide the shoots to the blades and to open the blades in a V-shaped manner against the spring means when the diameter of the shoots is greater than the distance between the converging wires.

2. In a harvester as defined in claim 1 further comprising a depending supporting wire having one end attached to the rear frame member and the other end bent transversely to the direction of travel of the harvester;
    an extension arm having a longitudinal aperture formed therein for receiving the bent end of the depending supporting wire; and
    a spacer block mounted on extension arm with the spring means connected to the spacer block for supporting the spring means in a downward orientation.

3. A guiding and cutting assembly longitudinally mounted to a harvester frame for cutting mature shoots such as asparagus and the like having the specified diameter or greater, said assembly comprising:
    (a) complementary cutting blades having longitudinal cutting edges;
    (b) two spaced parallel lightweight leaf springs attached to the back end of the cutting blades for biasing the blades together in an overlapping cutting relationship, said lightweight leaf springs having biasing forces that may be readily overcome by the movement of a mature shoot between the converging wires to spread the blades apart;
    (c) resilient means engaging the outer sides of the cutting blades intermediate the ends of the blades for readily permitting the blades to pivot open to form a V shape against the lightweight leaf springs and for permitting further opening of the blades along the entire longitudinal cutting edges to permit the discharge of the debris; and
    (d) two transversely spaced wires connected to the harvester frame and extending downward and rearward in a converging manner to attach the front of the blades in which the distance between the converging wires immediately forward of the cutting blades is less than the diameter of the mature shoot so that when the two converging wires guide a mature shoot to the cutting blades the shoot will displace the wires to open the blades in a V-shaped manner against the spring means to receive and cut the shoot as the harvester moves forward.

References Cited

UNITED STATES PATENTS

| | | | |
|---|---|---|---|
| 1,059,589 | 4/1913 | Bang | 56—229 |
| 3,066,469 | 12/1962 | Chatagnier | 56—327 |
| 3,176,456 | 4/1965 | Franzen | 56—327 |
| 3,412,541 | 11/1968 | Fuchs | 56—327 |

RUSSELL R. KINSEY, Primary Examiner